United States Patent [19]

Wakui et al.

[11] Patent Number: 4,622,311
[45] Date of Patent: Nov. 11, 1986

[54] METAL OXIDE HAVING UNIFORM PORE SIZES, THE PROCESS FOR PRODUCING SAID METAL OXIDE, AND CATALYST CARRIER COMPRISING THE SAID METAL OXIDE

[76] Inventors: Tadahiro Wakui, Hatu-Kimura 201, 3-4-9, Soka, Soka-shi, Saitama 340; Tadahiko Handa, 2-10-80 Sakasegawa, Takarazuka, Hyogo 665, both of Japan

[21] Appl. No.: 630,562

[22] Filed: Jul. 13, 1984

[30] Foreign Application Priority Data

Jul. 15, 1983 [JP] Japan .................................. 58-130118

[51] Int. Cl.⁴ .......................... B01J 21/12; B01J 21/08; B01J 21/04
[52] U.S. Cl. .................................. 502/235; 502/263; 502/355; 423/111; 423/327
[58] Field of Search .......................... 502/263, 235, 355; 423/111, 335, 327

[56] References Cited

U.S. PATENT DOCUMENTS

| | | | |
|---|---|---|---|
| 2,526,907 | 10/1950 | Schmerling | 502/235 |
| 2,592,775 | 4/1952 | West | 502/235 |
| 3,094,384 | 6/1963 | Bertolacini | 502/355 X |
| 3,908,002 | 9/1975 | Holler | 502/355 X |
| 4,102,818 | 7/1978 | Eberly, Jr. | 502/355 X |
| 4,414,137 | 11/1983 | Young et al. | 502/233 X |

*Primary Examiner*—Carl F. Dees
*Attorney, Agent, or Firm*—Armstrong, Nikaido, Marmelstein & Kubovcik

[57] ABSTRACT

Metal oxides having a very narrow pore size distribution of micropores within the range of between 10 and 100 Angstroms can be prepared by reacting a water-soluble basic salt of a metal hydrate with an organic compound such as an acid halide in a specific manner. The pore diameter of the metal oxide can be arbitrarily controlled within the range of micropore size by changing the molecular chain length of an organic compound, treating with an acid or calcinating at a different temperature. It is desirable that the narrow pore size distribution is centered within the range of 1~30 Angstroms, preferably 1~15 Angstroms when the metal oxide is used as a catalyst carrier.

12 Claims, 4 Drawing Figures

METAL OXIDE HAVING UNIFORM PORE SIZES, THE PROCESS FOR PRODUCING SAID METAL OXIDE, AND CATALYST CARRIER COMPRISING THE SAID METAL OXIDE

BACKGROUND OF THE INVENTION

This invention relates to a specific metal oxide having uniform micropores, the process for producing said metal oxide and the catalyst carrier comprising said metal oxide. More particularly, the invention relates to various metal oxides having a very narrow pore size distribution in the micropores region within the range of between 10 and 100 Angstroms, in which the pore size of these metal oxides is slightly larger than that of Y-Zeolite which is the largest in crystalline aluminosilicates, the process for producing the above described metal oxides and the catalyst carriers comprising the metal oxides.

A number of industrial materials having the pores size of between some and a few thousands Angstroms such as an adsorbent, an ion exchange material and a catalyst are vastly used and noted. For example, metal oxides such as γ-alumina and silica gel are important inorganic materials: these metal oxides are widely utilized as a catalyst carrier, an adsorbent of water, an adsorbent of gaseous organic compounds and inorganic compounds and so on. Mixed metal oxides are also important inorganic materials because they have high acidic property. Herein, each metal oxide as a constituent component of mixed metal oxides does not have such high acidic property. It is well recognized that the structure of carriers, especially, the pore size is a very important factor in preparing a catalyst having high catalytic activity: it is well known that the pore size affects strongly catalytic activity, selectivity and catalyst life in catalytic reactions. It has become apparent that the pore size of the macropores, defined as the pores having more than 100 Å also affects strongly catalytic activity, selectivity and catalyst life, in connection with diffusion, contact area and other factors. However, it is well known that the pore size of the micropores, defined as the pores having less than 100 Å is a more important factor of catalytic activity and selectivity than the macropores. Especially crystalline aluminosilicates having the pore sizes within the range of between 4 and 11 Angstroms, called "Molecular sieve", is characterized by having uniform micropores and is known as a shape selective catalyst which is used for various syntheses such as the synthesis of hydrocarbons, cracking of linear hydrocarbons and alkylation of aromatic compounds. On the other hand, porous materials having a uniform pore size are expected to have the intimate relationship to various industrially and technologically important properties. However it has not been reported yet that an amorphous metal oxide having substantially uniform micropores can be prepared.

Several methods on controlling the micropore structure of a carrier, a catalyst or a mixture of them have been reported. Taniguchi et al. [Bulletin of the Japan Petroleum Institute, 13 (2), 147 (1971)] described the effect of the following preparation conditions on the pore structure of alumina; pH of the reaction solution, the concentration of starting materials in gelation, the acid treatment of alumina hydrates and the alcohol treatment of alumina hydrates such as boehmite gel. Baswadian et al. [J. Catal. 1, 547 (1962)] also described the effect of the addition of various substances such as water-soluble or dispersed organic polymers, a volatile salts or sulfur to alumina and silica gel, on the pore structure of these oxides. The above oxides obtained by the addition of water-soluble organic polymers such as polyethylene glycohol, polyvinyl alcohol, methyl cellulose and polyethylene oxide to hydrous gels of the above oxides have a very wide distribution of the pore diameter from 20 to 10000 Angstroms. Thus, a carrier or a catalyst having a very narrow pore size distribution within the specific range can not be easily obtained by a conventional process, as can be seen in the above mentioned references.

SUMMARY OF THE INVENTION

As the result of various investigations of the process for the production of amorphous metal oxides having substantially uniform micropores, the pore size distribution being very narrow and the pore sizes being slightly larger than that of Y-Zeolite (pore diameter; 11 Angstroms) which has the largest pore size in typical zeolites, it has now been discovered that metal oxides having substantially uniform micropores can be prepared by reacting a water-soluble basic salt of a metal hydrate with an organic compound such as an acid halide in a specific manner and that the pore diameter of the metal oxide can be arbitrary controlled according to the above described method. Moreover it has been found that metal oxides having substantially uniform micropores can be prepared by various methods such as: addition of three components at the same time in solution wherein three components are alkali or ammonium salt (1) of metal hydrate such as water glass, organic compounds such as organic halides (2) and metal salts such as metal nitrates (3) (method A); or co-precipitation by adding a solution containing an organic compound in an organic solvent to a water solution of alkali or ammonium salts of metallic acid such as water glass, followed by adding another solution of metal salts to the above still liquid solution (method B); or adsorption of metal hydrogel on another hydrogel previously precipitated by reacting a metal acid salt such as alkali metal or ammonium metal salts with an organic compound (method C). It has also been found that the pore diameter of the above metal oxide can be arbitrary controlled according to the above described methods.

DETAILED DESCRIPTION OF THE PREFERRED EMBODIMENTS

A more detailed description of the invention will now be given: metal acid salts such as alkali metal salts (Na, K, Li and so on) and ammonium salts are used as a starting material in the invention. For example, alumina can be prepared from an aluminate (a) and an acid halide (b) as starting materials. Herein an aluminate includes alkali metal salts such as Na, K and Li and ammonium salts. Even the other aluminates can be used, if they are water-soluble. The preferred aluminate is sodium aluminate. Silica gel also can be prepared from a silicate or a mixture of silicic acid and a silicate wherein the silicate includes alkali metal salts such as Na, K and Li and ammonium salts. The preferred starting material for silica gel is a water glass which is a mixture of silicic acid and sodium silicate. Herein, the concentration of silicate in water glass is 1~50 weight %, preferably 25~35 weight % based on $SiO_2$. Water glass No2 or No3 product is usually used as a starting material of silica gel. Moreover, alkali metal salts or ammonium salts such as tungstates, vanadates and molybdates are also used as a starting material of metal oxides.

Organic compounds which are used in the invention have at least an organic group and reacting group in the molecule. Herein, the above described reacting group is desirable to react with a metal acid salt in competition with the condensation reaction of said metal acid salt. Organic compounds which are used in the invention are represented by the general formula $X_n$-R-$X'_n$ wherein R is an organic group, X is a reacting group, X' is a reacting group or hydrogen and n is an integer of 1~3. The above described R includes such groups as alkyl, alkenyl, cycloalkyl, allyl, aromatic and heteroaromatic, these groups being active or not active, wherein these groups may contain organic bonds in molecular chain such as ester, ether, sulfide, sulfoxide, sulfone, amide, amino and urethane. The number of carbons which are contained in an organic group can be selected according to a desirable pore dimension, the number of carbons being usually 1~30. An active group bonded to an organic group R includes the groups such as vinyl, allyl, hydroxyl (alcoholic, phenolic), amino, mercapto, carboxylic, imino, sulfone, carbonyl and cyano wherein organic active groups may be bonded to an organic 9roup R except that these groups act harmfully in gelation of metal acid salts. A preferable organic group R is alkyl or allyl which does not have an active group.

Reacting group X or X' include acid halide, sulfonyl halide, isocyanate, epoxy, ester and halogen such as chloro, bromo and iodo. The preferable organic compounds for tne production of a catalyst carrier are mono carboxylic acid halide wherein X is halo group and X' is hydrogen or dicarboxylic acid dihalide wherein X, X' are an acid halide (halide: chloride, bromide, iodide and so on).

The addition of a surface active agent may be necessary for the use of organic compounds having the combination of the groups such as: X is ester or halo group and X' is hydrogen; or X, X' are ester or halo group, wherein the reactivity of these groups are low and thus these groups exert no effect or little effect under a mild reaction condition. The above described organic compounds can be used by dissolving in a solvent such as tetrahydrofuran, alcohols (methanol, ethanol etc.), dimethyl formamide, dimethyl acetoamide, dimethyl sulfoxide, ketones (acetone, methylethyl ketone, etc.), acetonitrile, methylene chloride, chloroform, aromatic compounds (benzene, toluene, xylene etc.).

The preferable organic compounds which are used in the invention include dihalides (chlorides, bromides) of dicarboxylic acids such as malonic acid, succinic acid, each dicarboxylic acid of 1.3-propane, 1.4-butane, 1.5-pentane, 1.6-hexane, 1.7-heptane, 1.8-octane, 1.9-nonane, 1.10-decane, 1.11-undecane and 1.12-dodecane, sulfuric acid chloride, sulfuric acid bromide, acetyl chloride, halides (chlorides, bromides) of monocarboxylic acids such as propionic acid, lactic acid and each monocarboxylic acid of pentane, hexane, heptane, octane, nonane, decane, undecane, dodecane and hydrocarbon oligomers (the molecular weight is 500~1000) such as butadiene oligomer having one or two terminal reacting groups such as acid chloride, sulfonyl chloride, isocyanate or epoxy.

According to the invention, a metal oxide having uniform micropores can be prepared by the following method: the above described organic compound is dissolved in such a solvent as tetrahydrofuran. The solution is added to an aqueous solution of a metal acid salt with vigorous stirring at 0°~300° C. of preferably 0°~80° C. at a pressure of 0~100 $kg/cm^2A$, preferably at atmospheric pressure. After that, the pH of the resulting solution is adjusted to 6~9 by the addition of aqueous mineral acid. The resulting solid is washed successively with a concentrated ammonium solution, ammonium chloride solution and distilled water until free of chloride ion. The solid is extracted with an organic solvent such as acetone, methanol, ethanol or tetrahydrofuran. More than 95% of the organic compound hydrolized in the reaction may be recovered as a compound of carboxylic acid or sulfuric acid. A metal oxide can be obtained by drying that solid at 110°~120° C. for 4~5 hours and calcinating it at an arbitrary temperature. If necessary, the solid is treated with 1N-hydrochloric acid, then followed by calcinating at a chosen temperature. The above mentioned procedure of extraction with an organic solvent may be omitted: the solid can be directly dried and calcinated. However, it is preferable to extract the solid in order to obtain the metal oxide having high purity.

In the process of the invention, 0.1~500 parts preferably 0.5~100 parts by weight of an organic compound per 100 parts by weight of a metal acid salt is used. An acid solution used for adjusting the pH to 6~9 after reacting an organic compound with a metal acid salt includes inorganic acids such as hydrochloric acid, nitric acid and sulfuric acid, and organic acids such as formic acid and acetic acid. The concentration of the acid is preferably about 3 to 10 weight %, but is not particularly limited.

According to the invention, a metal oxide having a very narrow distribution of size of the micropores within the range of between 10 and 100 Angstroms can be prepared. Said metal oxide can not be obtained by a conventional process. Moreover, the pore diameter of said metal oxide can be controlled within the range of micropore sizes (<100 Å) by changing the molecular chain length of an organic compound, treating with an acid or calcinating at a different temperature. It is desirable that the narrow pore size distribution is centered within the range of 1~30 Angstroms, preferably 1~15 Angstroms when the metal oxide according to the invention is used as a catalyst carrier.

Figure 1:
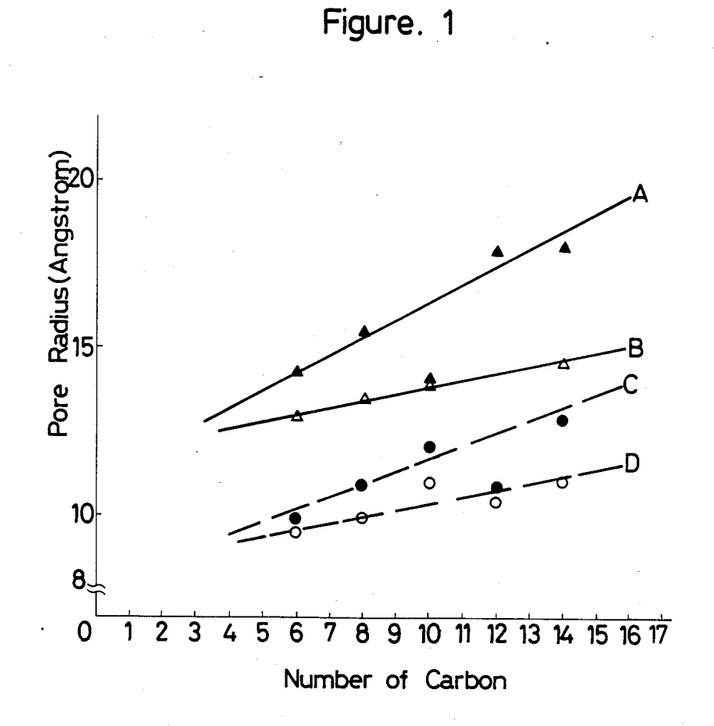
FIG. 1 is the graph of the relationship between the micropore diameter of the metal oxides in accordance with the invention and the molecular chain length of acid halides used for producing the above metal oxides.

The relationship between the micropore size of metal oxides and the molecular chain length of an acid halide used for producing the above oxides is shown in FIG. 1; the average pore radius on the vertical axis and the molecular chain length i.e., carbon number horizontally. In FIG. 1, A and B are the data for γ-alumina obtained at calcination temperatures of 550° C. and 450° C. respectively. C and D are the data of silica gel at 550° C. and 450° C. respectively. As shown in the figure, an inorganic oxide having a narrow pore size distribution within the range of less than 50 Angstroms can be obtained by using a relatively lower organic compound.

An inorganic oxide having a narrow pore size distribution within more than 50 Angstroms may be prepared by using an acid halide of an oligomer having one or two of a terminal active group such as carboxyl group.

For the production of the mixed metal oxides according to the invention, various kinds of metal acid salts such as alkali metal salts (Na, K, Li and so on) and ammonium salts are also used as the first component of starting materials mentioned previously. For example, for the production of silica.alumina or silica titania, silicic acid or a mixture of silicic acid and a silicate is used as a silica component of the above oxide wherein silicates include alkali metal salts such as Na, K and Li and ammonium salts. The preferred silicate is a water glass which consists of a mixture of silicic acid and sodium silicate, with water glass No3 particularly preferred. For the production of silica.alumina or alumina.boria, aluminate is used as an alumina component of the above oxide wherein aluminate include alkali metal salts such as Na, K and Li and ammonium salts. Even other aluminates can be also used if they are water-soluble. The preferred aluminate is sodium aluminate. Alkali metal salts or ammonium salts are also used as a starting material for the production of a mixed metal oxide containing W, V or Mo wherein a metal acid salt is tungstate, vanadate or molybdate, respectively. Nitrates, halides or sulfonates are preferably used as the metal salt i.e., the third component of starting materials previously mentioned.

A metal oxide having uniform micropores according to the invention can be prepared by various method described previously. Method A (mixing of three kinds of solutions at the same time). The above described organic compound is dissolved in a solvent such as tetrahydrofuran. The solution is added together with another solution of a metal salt such as nitrate to an aqueous solution of a metal acid salt such as an alkali metal salt with vigorous stirring at 0°~300° C. preferably 0°~80° C. at a pressure of 0~100 Kg/cm²A preferably at atmospheric pressure. The resulting solid is washed with ammonium chloride solution until free of alkali ion and with distilled water until free of chloride ion. The solid is extracted by an organic solvent such as acetone, methanol, ethanol and tetrahydrofuran. More than 95% of the organic compound dehydrated in the reaction may be recovered as a compound of carboxylic acid or sulfuric acid. A metal oxide mixture can be obtained by drying that solid at 110~120° C. and calcinating it at a chosen temperature. The above described extraction with an organic solvent may be omitted i.e., the solid can be directly dried and calcined. Method B (co-precipitation). A solution of the above described organic compound is added to an aqueous solution of a metal acid salt such as an alkali metal salt. Then, a solution of metal salt such as nitrate is added to the above still liquid solution with vigorous stirring. Thus obtained solid is treated with the same method as that of [A]. Method C (adsorption). A solution of an organic compound described above is added to an aqueous solution of a metal acid salt with vigorous stirring at 0°~300° C., preferably 0°~80° C. at a pressure of 0~100 Kg/m², preferably at atmospheric pressure. After that, the pH of the solution is adjusted to 6~9 by the addition of aqueous mineral acid. The resulting solid is washed successively with a concentrated ammonium solution, ammonium chloride solution and distilled water until free of chloro ion. Then, the solid is extracted by an organic solvent such as acetone, methanol and ethanol. The thus obtained hydrogel is impregnated with a water solution of metal salt such as nitrate. By adding ammonium solution to the above solution containing the hydrogel, another metal hydrogel is formed and adsorbed on the former hydrogel. The metal oxide mixture is obtained by drying the resulting solid at 110°~120° C. and calcinating it at a chosen temperature.

In the process of the invention, 0.1~500 parts preferably 0.5~100 parts by weight of organic compound per 100 parts by weight of metal salt is used. An acidic solution which is used in method [C] for adjusting the pH to 6~9 after reacting a metal acid salt with an organic compound include mineral acid such as hydrochloric acid, nitric acid and organic acids such as formic acid and acetic acid. The concentration of the above acid is preferably 3~10 weight %, but is not limited.

According to the invention, a metal oxide mixture having a very narrow pore size distribution within the range of between 10 and 100 Angstroms can be prepared. Such a metal oxide mixture can not be obtained by a conventional process. It is desirable that the pore size distribution is centered within the range of 1~30 Angstroms, preferably 1~15 Angstroms when a metal oxide mixture according to the invention is used as a catalyst carrier. Moreover, the pore diameter of said metal acid mixture can be controlled by changing the molecular chain length of the organic compound used in the invention. For example, a metal oxide mixture having a narrow pore size distribution within the range of between 10 and 50 Angstroms can be obtained by using an organic compound having relatively lower molecular weight, whereas a metal oxide mixture having a narrow pore size distribution within the range of more than 50 Angstroms can be prepared by using various kinds of acid halide oligomers (molecular weight 500~1000) having one or two terminal carboxylic group such as butane oligomer. The thus obtained metal acid mixtures show acidic property by a combination of the above metals and have catalytic activity for the alkylation of phenol with lower olefin such as ethylene or propylene.

The following examples are given to illustrate the present invention.

EXAMPLE 1

A γ-alumina was prepared as follows: 100 g of sodium aluminate was dissolved in 700 ml of water. The solution was cooled below 20° C. with vigorous stirring. The second solution was prepared by dissolving 20 g of sobacoyl dichloride in 50 ml of tetrahydrofuran. The solution was added dropwise to the former solution with vigorous stirring. Then a milky fine solid was gradually precipitated. After the addition was completed, stirring was continued for an additional 1 hour at 40~60° C., followed by adjusting the pH to about 6~9 by adding 5% nitric acid solution. After that, stirring was continued for an additional 3~4 hours. The solution was cooled and allowed to stand for some time. Then the precipitate was filtered and washed successively with an ammonium solution, 10% ammonium chloride solution and distilled water until free of chloride ion. The solid was extracted with acetone and hydrolized 1.6-hexane dicarboxylic acid (C-6) deposited together with alumina hydrogel was recovered. Thus obtained solid was dried at 110° C. for 4 hrs. and calcined by using an electric furnace at 450° C. for 5 hours in air. A part of the above solid was calcined at 550° C.

X-ray diffraction measurements were carried out in conventional manner. The above obtained solid showed having the largest differential pore volume shown in Table 1 has a very important meaning.

TABLE 1

| Number | Starting Material | Organic Compound | Calcination Temperature °C. | Surface Area m²/g | Pore Volume ml/g | Average Pore Radius A° | Pore Diameter Having the Large Differential Pore Volume A° |
|---|---|---|---|---|---|---|---|
| 1 | Sodium Aluminate | A-1, C-2 C-4 C-6 | 550 450 | 365 334 | 0.26 0.19 | 14.2 11.5 | 17.0 13.8 |
| 2 | Sodium Aluminate | C-8 O-1 O-2 | 550 450 | 409 396 | 0.29 0.27 | 13.9 13.8 | 18.1 15.7 |
| 3 | Sodium Aluminate | C-10 | 550 450 | 340 445 | 0.31 0.34 | 18.0 14.5 | 20.4 16.4 |
| 4 | Sodium Aluminate | C-12 O-3 | 550 450 | 289 299 | 0.30 0.21 | 20.7 14.2 | 28.6 16.6 |
| 5 | Sodium Aluminate | O-4 | 550 | 259 | 0.30 | 23.0 | 42.1 | lines at 1.99 Å and 1.39 Å, which belong to typical γ-alumina. Another experiment was carried out: after the extraction of the above described organic compound, the resulting solid was treated with 1N-hydrochloric acid at 80° C. for 3 hours, followed by calcinating at 450~600° C. for 5 hours by using an electric furnace. The surface of thus obtained γ-alumina was measured by means of BET method based on nitrogen adsorption, and the pore volume and the pore size distribution by the nitrogen-adsorbing method. The pore size distribution of a γ-alumina obtained by a process of the invention is shown in FIG. 2.

Figure 2:
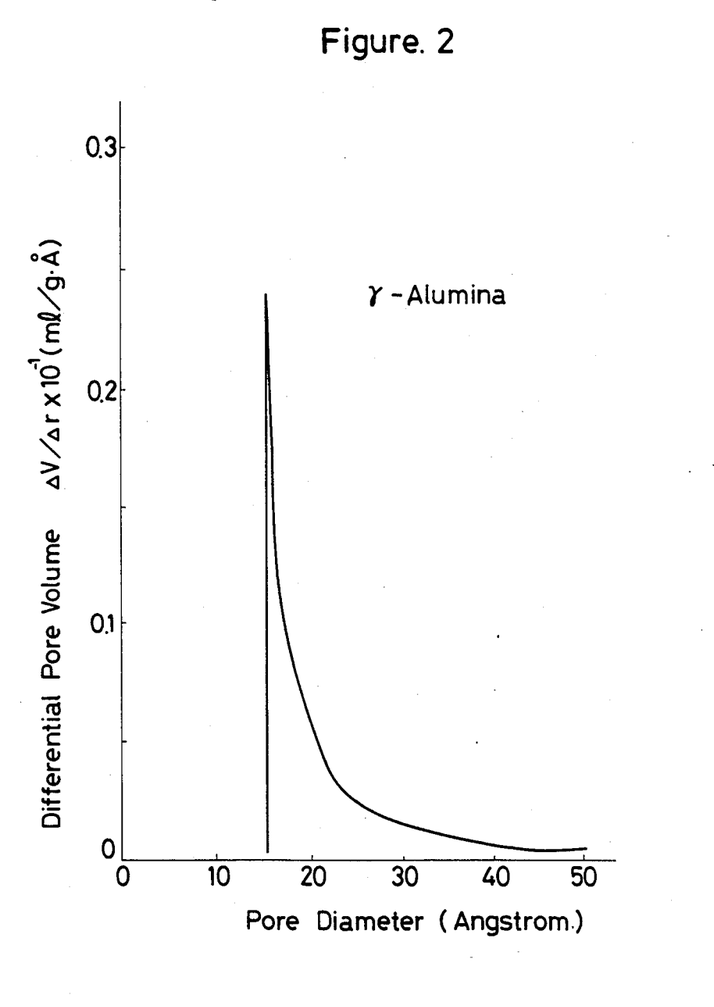
FIG. 2 is the graph of the pore size distribution of γ-aluminas in accordance with the invention.

FIG. 2 is the graph with a differential pore volume on the vertical axis and a pore diameter horizontally. It shows clearly that the Y-alumina obtained by the process of the invention has a very narrow pore size distribution.

Some physical properties (surface area, pore size distribution, pore volume etc.) of γ-aluminas are shown in Table 1, wherein the γ-aluminas were prepared by the same method as that described above except that the following organic compounds were used as one of the starting materials: an acid halide in which acid includes succinic acid (C-2), 1.4-butane dicarboxylic acid (C-4), 1.8-octane dicarboxylic acid (C-8), 1,10-decane dicarboxylic acid (C-10), 1,12-dodecane dicarboxylic acid (C-12), acetyl chloride (A-1), phthaloyl, isophthaloyl and terephthaloyl dichloride (0-1, 0-2, 0-3 respectively) and an acid halide of oligomer having two terminal carboxyl group (molecular weight 1000) (0-4). These γ-aluminas have a very narrow pore size distribution. Therefore it is considered that a pore diameter

EXAMPLE 2

A silica gel was prepared by the same method as in Example 1 except that commercially available water glass No3 product and 1.4-butane dicarboxylic acid were used as starting materials. Thus obtained silica gel was dried at 110° C. for 3 hrs. The solid was calcined partly at 450° C. and partly at 550° C. for 4 hrs. A part of the solid was treated with 1N-hydrochloric acid at 60° C. for 3 hrs. as in Example 1, followed by calcinating at 450° C. for 4 hrs. by using an electric furnace. The pore size distribution of the silica gel is shown in FIG. 3.

Figure 3:
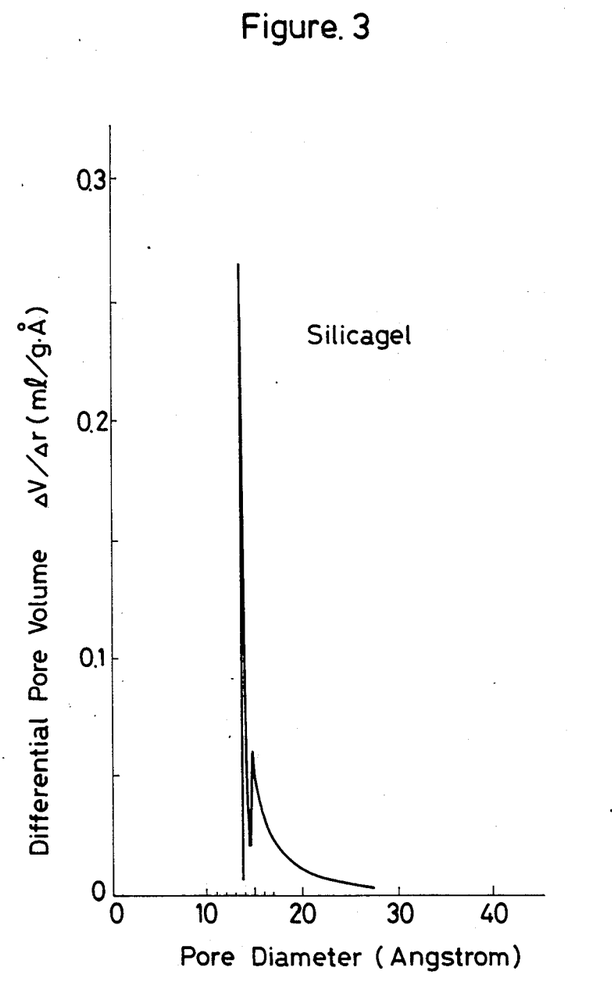
FIG. 3 is the graph of the pore size distribution of silica gels obtained in accordance with the invention.

FIG. 3 is the graph with the differential pore volume on the vertical axis and pore diameter horizontally. It can be seen from the figure that the silica gel which was prepared by the process of the invention had a very narrow pore size distribution.

Some physical properties (surface area, pore size distribution, pore volume etc.) of silica gels are shown in Table 2 wherein the silica gels were prepared by the same method as that described above except that the following organic compounds were used as one of the starting materials: an acid halide in which acid include succinic acid, 1,6-hexane dicarboxylic acid, 1,8-octane dicarboxylic acid, 1,10-decane dicarboxylic acid, 1,12-dodecane dicarboxylic acid, acetyl chloride and ortho-, metha- and para phthaloyl chloride (symbols are the same in Example 1). Herein, it should be noted that the values of pore diameter, surface area and pore volume shown in Table 1 and 2 are not absolute ones.

TABLE 2

| Number | Starting Material | Organic Compound | Acid Treatment | Calcination Temperature °C. | Surface Area m²/g | Pore Volume ml/g | Average Pore Radius A° | Pore Diameter Having the Large Differential Pore Volume A° |
|---|---|---|---|---|---|---|---|---|
| 1 | Water glass | A-1, C-2 C-4 C-6 | No No Yes | 550 450 550 | 394 587 477 | 0.22 0.29 0.22 | 10.94 9.9 9.3 | 13.0 12.6 13.2 |
| 2 | Water glass | C-8 O-2 | No No Yes | 550 450 550 | 532 373 672 | 0.33 0.21 0.31 | 12.2 11.0 9.2 | 13.1 13.6 13.0 |
| 3 | Water glass | C-10 C-12 | No No Yes | 550 450 550 | 366 360 435 | 0.24 0.19 0.21 | 12.8 11.1 9.8 | 17.2 15.3 13.5 |
| 4 | Water glass | O-1 O-3 | No No | 550 450 | 511 466 | 0.25 0.22 | 9.7 9.2 | 13.2 13.2 |
| 5 | Water | O-4 | No | 550 | 253 | 0.31 | 24.0 | 41.3 |

TABLE 2-continued

| Number | Starting Material | Organic Compound | Acid Treatment | Calcination Temperature °C. | Surface Area m²/g | Pore Volume ml/g | Average Pore Radius A° | Pore Diameter Having the Large Differential Pore Volume A° |
|---|---|---|---|---|---|---|---|---|
| | glass | | | | | | | |

EXAMPLE 3

100 g of commercially available water glass No3 product was dissolved in 600 ml of water. The temperature of the solution was maintained at 40° C. with vigorous stirring. A solution containing 20 g of 1,6-hexane dicarboxylic acid dichloride in 50 ml of tetrahydrofuran and another solution containing 30 g of aluminium chloride in 200 ml of water were added dropwise together to the above solution containing water glass with vigorous stirring. Then a milky fine solid was gradually precipitated. After the addition was completed, stirring was continued for additional 4~5 hours at the above temperature. After that, the solution was cooled and allowed to stand. The precipitate was filtered and washed successively with ammonium solution, 10% ammonium chloride solution and water until free of chloride ion. The solid was extracted with acetone and was dehydrated by adding water. 1.6-hexane dicarboxylic acid deposited together with silica alumina hydrogel was recovered Thus obtained solid was dried by using an electric furnace at 110° C. for 4 hrs. and calcinated at 450°~600° C. in air for 5 hrs. The surface area of silica alumina was 455 m²/g, the pore volume was 0.3 ml/g, the average pore radius was 12.9 Angstroms and the pore diameter having the largest differential volume was 14.8 Angstroms. The surface area of thus obtained silica.alumina was measured by means of BET method based on nitrogen adsorption, and the pore volume and the pore size distribution by the nitrogen-adsorbing method.

EXAMPLE 4

Figure 4:
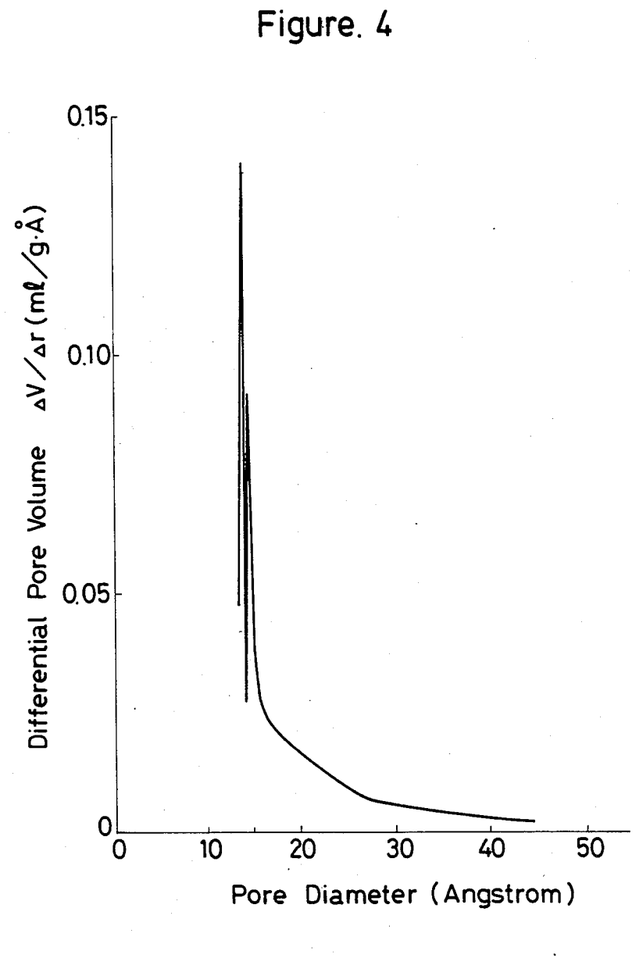
FIG. 4 is the graph of the pore size distribution of metal acid mixtures in accordance with the invention.

100 g of commercially available water glass No3 product was dissolved in 800 ml of water and kept at 40° C. with vigorous stirring. A solution containing 20 g of 1.8-octane dicarboxylic acid dichloride in 40 ml of tetrahydrofuran was added dropwise to the former solution with vigorous stirring. Then a solution containing 30 g of aluminium chloride in 200 ml of water was added to the above still liquid solution with vigorous stirring. A white precipitate was gradually deposited. The solid was treated in the same method as in Example 3 and calcined at 450°~600° C. for 5 hours in air by using an electric furnace. The surface of thus obtained silica.alumina was 470 m²/g, the pore volume was 0.25 ml/g, the average pore radius was 10.6 Angstroms and the pore diameter having the largest differential pore volume was 14.0 Angstroms. The pore size distribution of the above obtained silica.alumina was shown in FIG. 4 which is the graph with differential pore volume on the vertical axis and average pore diameter horizontally. It shows clearly that the silica.alumina obtained by the process of the invention has a very narrow pore size distribution.

EXAMPLE 5

100 g of commercially available water glass No3 product was dissolved in 800 ml of water and cooled below 20° C. A solution containing 20 g of 1.4-butane dicarboxylic acid dichloride in 50 ml of tetrahydrofuran was added dropwise to the former solution with vigorous stirring. After the addition was completed, stirring was continued for additional 1 hour at 40°~60° C., followed by adjusting the pH to about 6~9 by adding 5% nitric acid solution. After that, stirring was continued for an additional 3~4 hrs. at the above described temperature. The solution was cooled for a while, and allowed to stand. The precipitate of silica hydrogel was filtered, washed and then extracted by acetone. The above solid was impregnated with a solution containing 30 g of aluminium chloride in 1 l of water with stirring for few hours. By adding ammonium solution to the above solution, alumina hydrogel was formed and adsorbed on the above silica gel. Thus obtained solid was filtered and washed successively with 10% aluminium chloride solution and distilled water thoroughly. Then the solid was dried at 110° C. for 4 hrs. and calcined at 450°~600° C. for 5 hrs. The surface area of the above obtained silica.alumina was 390 m²/g, the pore volume was 0.24 ml/g, the average pore radius was 11.9 Angstroms and the pore diameter having the largest differential pore volume was 14.5 Angstroms.

What we claim is:

1. A process for producing a metal oxide comprising the steps of:
(a) reacting (i) a salt selected from the group consisting of alkali metal salts and ammonium salts of aluminates and silicates with (ii) an organic compound represented by the formula $$X_n\text{-R-}X'_n$$

wherein R is an alkyl, alkenyl, cycloalkyl, allyl, aromatic group, or heteroaromatic group having up to 30 carbon atoms,
X and X' are functional groups which are the same or different, and each is acid halide, sulfonyl halide, isocyanate, epoxy, ester, chloro, bromo or iodo,
and n is an integer from 1 to 3;
(b) extracting the resultant solid with an organic solvent selected from the group consisting of tetrahydrofuran, alcohols, dimethylformamide, dimethylacetoamide, dimethyl sulfoxide, ketones, acentonitrile, methylene chloride, chloroform and aromatic solvents; and
(c) removing the organic solvent from the solid or burning out the solvent by calcinating the solid;
whereby the metal oxide obtained has unifrom micropores with a pore size distribution concentrated substantially within the range of 10–100 Angstrons.

2. A process as in claim 1, wherein the organic compound is an acid halide of a dicarboxylic acid.

3. A process as in claim 1, wherein the width of the pore size distribution is 1–10 Angstroms.

4. A process for producing a metal oxide mixture comprising the steps of:
(a) reacting (i) a salt of a first metal selected from the group consisting of alkali metal salts and ammonium salts of aluminates and silicates with (ii) an organic compound represented by the formula $$X_n\text{-}R\text{-}X'_n$$

wherein R is an alkyl, alkenyl, cycloalkyl, allyl, aromatic group, or heteroaromatic group having up to 30 carbon atoms, X and X' are functional groups which are the same or different, and each is acid halide, sulfonyl halide, isocyanate, epoxy, ester, chloro, bromo or iodo, and n is an integer from 1 to 3, and (iii) a salt of a second metal selected from the group consisting of nitrates, halides and sulfonates of aluminum and silicon;

(b) extracting the resultant solid with an organic solvent selected from the group consisting of tetrahydrofuran, alcohols, dimethylformamide, dimethylacetoamide, dimethyl sulfoxide, ketones, acetonitrile, methylene chloride, chloroform and aromatic solvents; and (c) removing the organic solvent from the solid or burning out the solvent by calcinating the solid;

whereby the metal oxide mixture obtained has uniform micropores with a pore size distribution concentrated substantially within the range of 10–100 Angstroms.

5. A process as in claim 4, wherein the organic compound is an acid halide of a dicarboxylic acid.

6. A process as in claim 4, wherein the width of the pore size distribution is 1–30 Angstroms.

7. A metal oxide produced by a process comprising the steps of:

(a) reacting (i) a salt selected from the group consisting of alkali metal salts and ammonium salts of aluminates and silicates with (ii) an organic compound represented by the formula $$X_n\text{-}R\text{-}X'_n$$

wherein R is an alkyl, alkenyl, cycloalkyl, allyl, aromatic group, or heteroaromatic group having up to 30 carbon atoms, X and X' are functional groups which are the same or different, and each is acid halide, sulfonyl halide, isocyanate, epoxy, ester, chloro, bromo or iodo, and n is an integer from 1 to 3;

(b) extracting the resultant solid with an organic solvent selected from the group consisting of tetrahydrofuran, alcohols, dimethylformamide, dimethylacetoamide, dimethyl sulfoxide, ketones, acetonitrile, methylene chloride, chloroform and aromatic solvents; and (c) removing the organic solvent from the solid or burning out the solvent by calcinating the solid;

whereby the metal oxide obtained has unifrom micropores with a pore size distribution concentrated substantially within the range of 10–100 Angstroms.

8. A metal oxide as in claim 7, wherein the organic compound is an acid halide of a diacarboxylic acid.

9. A metal oxide as in claim 7, wherein the width of the pore size distribution is 1–30 Angstroms.

10. A metal oxide mixture produced by the process comprising the steps of:

(a) reacting (i) a salt of a first metal selected from the group consisting of alkali metal salts and ammonium salts of aluminates and silicates with (ii) an organic compound represented by the formula $$X_n\text{-}R\text{-}X'_n$$

wherein R is an alkyl, alkenyl, cycloalkyl, allyl, aromatic group, or heteroaromatic group having up to 30 carbon atoms, X and X' are functional groups which are the same or different, and each is acid halide, sulfonyl halide, isocyanate, epoxy, ester, chloro, bromo or iodo, and n is an integer from 1 to 3, and (ii) a salt of a second metal selected from the group consisting of nitrates, halides and sulfonates of aluminum and silicon;

(b) extracting the resultant solid with an organic solvent selected from the group consisting of tetrahydrofuran, alcohols, dimethylformamide, dimethylacetoamide, dimethyl sulfoxide, ketones, acetonitrile, methylene chloride, chloroform and aromatic solvents; and (c) removing the organic solvent from the solid or burning out the solvent by calcinating the solid;

whereby the metal oxide mixture obtained has uniform micropores with a pore size distribution concentrated substantially within the range of 10–100 Angstroms.

11. A metal oxide mixture as in claim 10, wherein the organic compound is an acid halide of a dicarboxylic acid.

12. A metal oxide mixture as in claim 10, wherein the width of the pore size distribution is 1–30 Angstroms.

* * * * *